United States Patent Office 3,761,329
Patented Sept. 25, 1973

3,761,329
COLOR FLARE INCLUDING POLYVINYL CHLORIDE COLOR INTENSIFIER
Hector Joseph Zilcosky, Colebrook, Conn., assignor to The Ensign-Bickford Company, Simsbury, Conn.
No Drawing. Filed Sept. 23, 1971, Ser. No. 183,255
Int. Cl. C06d 1/10
U.S. Cl. 149—19.91                7 Claims

ABSTRACT OF THE DISCLOSURE

A pyrotechnic color flare composition consisting essentially of a color producing salt, powdered metal fuel and a perchlorate oxidizer utilizes a substantial amount of a plasticized polymeric color intensifier capable of rendering the composition formable by molding, casting, extruding and the like. The color intensifier constitutes about 20–50% by weight of the pyrotechnic charge and consists of substantial equal proportions of polyvinyl chloride resin and a plasticizer. The resultant color flare charge exhibits substantial cohesive strength, toughness and flexibility as well as improved color intensity and purity.

BACKGROUND AND SUMMARY OF THE INVENTION

The present invention relates generally to color flares and is concerned more particularly with a new and improved pyrotechnic color flare composition.

Widely used and well accepted illuminating or flare compositions are based on the brilliant light produced by the burning of metallic magnesium in the presence of a suitably oxidizing agent. Attempts have been made to increase the luminocity of such compositions by various techniques such as reducing the particle size of the magnesium or adding booster materials such as magnesium oxide. Although such attempts have met with limited success and produced a somewhat greater amount of light from a given composition, corresponding success has not been achieved when the same principles have been applied to color flares. Although quantitative data is not available it is believed the lack of success in the color area is due primarily to efforts to produce more light rather than efforts towards producing greater color purity.

Heretofore it has also been the practice to manufacture pyrotechnic flares from dry combustible mixtures by subjecting the mixture to high compacting pressure in order to consolidate the particular composition. However, such a technique frequently produced flares having compositions of varying density and suitable control over the burning rate of the flare was not achieved. Additionally, the compacting operation placed severe limitations on the design of the charge container, frequently preventing the use of containers of the most desirable or advantageous configuration.

In order to avoid this deficiency it has been suggested that various pyrotechnic formulations employ a polymeric resin, such as a polyester or acrylic resin, as a binder for the pyrotechnic composition. However, in order to avoid excessive dilution of the composition or adverse effect on the burn rate thereof, the binders generally constituted less than 10% of the total weight of the pyrotechnic composition. In the case of acrylic polymers it has been suggested that a liquid monomer or prepolymer be utilized as the binder and that further polymerization be effected after it has been added to the mixture. Unfortunately such mixtures generally require an inordinately long curing time, that is, a curing time of about 12 to 24 hours or more under carefully controlled conditions in order to insure proper in-situ polymerization of the binder.

Accordingly, it is a primary object of the present invention to provide a new and improved pyrotechnic color flare composition that obviates many of the deficiencies found in color flares utilized hereinbefore while at the same time providing substantially improved color intensity and purity.

It is another object of the present invention to provide a new and improved color flare composition of the type described which utilizes a polymeric color intensifier capable of facilitating the forming of the composition into various desired shapes by molding, casting, extruding or the like. Included in this object is the provision for color flare charges having sufficient cohesive strength, toughness and flexibility to be capable of use without the necessity for a bulky canister or other confining or enclosing container.

Still another object of the present invention is to provide a new and improved pyrotechnic color flare composition capable of utilizing the heat generated by the oxidation of a metallic powder fuel, such as magnesium, to produce the desired energy for properly stimulating and exciting a color emitting compound to effect emission of visible light within only a limited portion of the visible spectrum.

An additional object of the present invention is to provide a color flare composition of the type described capable of being stored for prolonged periods of time without adverse effect on its performance characteristics.

Other objects will be in part obvious and in part pointed out in more detail hereinafter.

These and related objects are accomplished in accordance with the present invention by providing a pyrotechnic color flare composition of the fuel/oxidizer type containing color producing salts and about 20% by weight and more of a plasticized resin color intensifier having a moderate to high halogen content.

A better understanding of the objects, advantages, features, properties and relationships of the invention will be obtained from the flowing detailed description which sets forth certain illustrative embodiments and is indicative of the various ways in which the principles of the present invention are employed.

DESCRIPTION OF A PREFERRED EMBODIMENT

As mentioned, the present invention involves the incorporation or addition of substantial amounts of a plasticized halogen-containing resin to an inorganic color flare composition in order to enhance and intensify the color emitted within a limited portion of the visible spectrum and at the same time render the composition formable. The inorganic portion of the composition consists of a powdered metal fuel, such as magnesium, an inorganic oxidizer, such as ammonium perchlorate and a color producing alkaline earth metal salt. The particular manner in which the color intensifying resin acts is not fully understood but it is believed that under the temperature conditions created by the oxidation of the magnesium, he plasticized resin produces increased amounts of available halogen for reaction with the alkaline earth metal salts. The resultant alkaline earth metal halides, in the vapor state and under the temperature conditions created by the oxidation of the powdered magnesium, emit increaesd illumination within a narrower band of the visible color spectrum, thus achieving greater color intensity and purity. The particular color intensifier utilized is a plasticized organic resin in the form of a plastisol, i.e., a suspension of the resin in a suitable plasticizer in the absence of a volatile solvent. The suspension or dispersion contatins no volatile components and preferably acts as the vehicle for homogeneously admixing the remaining components of the entire formulation while at the same time serving as a binder for the resultant pyrotechnic charge.

The halogenated resins found most suitable to functioning as color intensifiers in the composition of the present invention are the high molecular weight polymers and copolymers having a moderate to high halogen content, such as vinyl chloride and copolymers thereof. In this connection the vinyl resins sold by B. F. Goodrich under the trade name "Geon," such as "Geon 112," have given good results. These polymers are high molecular weight homopolymers of vinyl chloride having an average molecular weight of about 200,000. The solid particular resin has a specific gravity of about 1.4 and an inherent viscosity of about 1.2 as measured by test procedure ASTM D-1234-60-A. The preferred material, polyvinyl chloride, has a chlorine content of about 56%; however, other polymers and copolymers of moderate to high halogen content, such as vinylidene chloride, may also be employed.

The polymer resin as received from the supplier is a fine powder having a bulk density of about 20-25 lbs./cubic foot and a particle size small enough so that 100 percent of the powder easily passes through a 200 mesh screen. The resin is preferably of the "stir-in" type and is preferably plasticized with a suitable plasticizer of the general purpose type such as dioctyl phthalate, using substantially equal proportions of the resin and the plasticizer to produce the desired plastisol. However, frequently it is desired to reduce the relative amount of plasticizer in order to achieve proper processing conditions.

Advantageously the organic plasticizer used in conjunction with the halogen containing resin acts as a vehicle for mixing and homogenizing the components of the formulation while obviating the use of solvents in the system. The plasticizer may be of the general purpose type suited for use with halogen-containing polymers such as polyvinyl chloride and should not tend to migrate or separate from the resin upon storage. The preferred plasticizers are generally esters of dibasic acids such as phthalic, adipic, maleic, succinic or the like. For example, plasticizers such as dibutyl and dioctyl phthalate, dihexyl sebacate, dilauryl adipate and the like may be uesd. These liquid plasticizers, being fully compatible with the resin and of low volatility, become an integral nonmigrating part of the composition and serve as a dispersing medium for the magnesium, oxidizer and alkaline earth metal salt.

Good results are achieved when stoichiometric amounts or proportions of the plastisol and alakaline earth metal compounds are utilized in the flare composition. However, variations in the amounts of the respective components are permissible. Accordingly the plasticized resin or plastisol may broadly constitute about 20% by weight or more while the amount of alkaline earth metal salt may be from about 30% to about 70% by weight of the total pyrotechnic flare composition. The powdered metal fuel, such as powdered magnesium, generally constitutes less of the pyrotechnic composition of the present invention than in comparable flare compositions where greater light is required and where color purity and intensity are relatively less significant features of the composition. Additionally, in contrast to prior compositions the amount of alkaline earth compund is generally in excess of the amount of magnesium employed in the composition in order to maintain the proper balance between the amount of light generated and the color purity and intensity sought from the pyrotechnic flare composition. In this way, the composition of the present invention avoids the trend toward increased amounts of light since it is believed that substantially greater amounts of light produced by the composition will tend to "bleach out" the color and will result in poorer color quality. Thus while the alkaline earth compounds employed in the composition may vary within the aforementioned range, the powdered magnesium should constitute only about 35% by weight or less of the composition and less than the amount of alkaline earth metal salt. Thus it has been found that the beneficial compositions produced in accordance with the present invention generally fall within the approximate preferred amounts given in Table I.

TABLE I

| Components | Parts by weight | |
|---|---|---|
| | Range | Preferred |
| Plastisol | 20-50 | 25 |
| Oxidizer | 10-30 | 15 |
| Metal powder | 5-35 | 25 |
| Alkaline earth metal compound | 30-65 | 35 |

In preparing the pyrotechnic color flare composition of the present invention, the various components are mixed in a conventional manner so as to obtain full homogeneite of the compounds. Thus the plastisol is initially prepared by mixing the polyvinyl chloride resin with the plasticizer to form the desired dispersion or suspension to which is subsequently added the magnesium powder, color producing compound, and oxidizer. The components are blended in a suitable mixing container to provide the requisite homogeneous distribution of the components throughout the composition. For safety considerations, it is generally preferred that the oxidizer be the last component to be added to the mixture.

The amount of plastisol and the particle size of the solids help to control the viscosity of the mix for the subsequent casting or extruding operation. Accordingly it is preferred that these be varied to adjust the viscosity to about 250,000 cps. As it will be appreciated the burn rate of the composition may be modified slightly by varying the amounts of oxidizer or magnesium or by altering the particle size of the various components.

The homogeneous mixture may then be poured into suitable molds or containers such as aluminum, paper, plastic or similar type molds of the desired shape or added to an extruder for subsequent fabrication into its final configuration. The suitably configured or extruded pieces or charges of flare composition are then cured at moderate temperatures such as at temperatures of 300° F. for a period of approximately 2-3 hrs. or at temperatures of about 350° F. for approximately 30 minutes.

The resultant charges exhibit excellent flexibility and do not break when bent, even into the form of a U-shape. The resultant charges conventionally have a density of about 1.5 and exhibit excellent structural integrity and strength. They are relatively insensitive to impact and are usually ignited without the necessity for an ignition composition. Of course it will be appreciated that suitable ignition compositions including delay elements and the like may be used with the flare compositions when desired.

It is an advantageous feature of the present invention that the resultant flare charges may be stored for prolonged periods of time without adversely affecting their performance characteristics. In fact these compositions have been stored for 30 days at 170° F. and found to exhibit no change in performance as a result thereof.

The invention will be further described with reference to the following specific examples which are provided so that the present invention can be more readily understood. These examples are given by way of illustration only and are not intended to be a limit on the practice of the invention. All amounts are given as parts by weight unless otherwise specified.

EXAMPLE 1

A pyrotechnic color flare composition was prepared by initially mixing equal amounts of polyvinyl chloride resin (Geon 121) and dioctyl phthalate plasticizer until the mix was homogeneous. To 20 parts by weight of the plastisol was added approximately 35 parts of strontium nitrate and 25 parts magnesium powder which were thoroughly blended into the mixture. Next about 20 parts by weight of ammonium perchlorate was added to the composition and the entire mixture was blended for about 15 minutes using a wire whip paddle.

The resultant paste-like mixture was then poured into a 4-inch long cardboard mold of generally cylindrical configuration having a diameter of about 1 inch and the filled mold placed in an oven at 340° F. for one half hour. The composition was cooled and the resultant solid charge removed from the cardboard mold. It exhibited excellent flexibility and cohesiveness. Upon ignition it burned in about 60 seconds exhibiting a brilliant red color having a color value of 0.65 at an intensity level of 15,900 candles. Storage of the composition for 30 days at 170° F. produced no change in performance characteristics.

EXAMPLES 2–4

The procedure of Example 1 was repeated except that the proportions of the components were changed as indicated in Table II.

TABLE II

| Example | 2 | 3 | 4 |
|---|---|---|---|
| Polyvinyl chloride, percent | 10 | 10 | 15 |
| Plasticizer, percent | 10 | 10 | 15 |
| Strontium nitrate, percent | 45 | 35 | 35 |
| Magnesium, percent | 25 | 35 | 25 |
| Ammonium perchlorate, percent | 10 | 10 | 10 |
| Intensity (candles) | 17,500 | 31,400 | 10,400 |
| Color value | .545 | .550 | .620 |
| Burn time (seconds) | 57.6 | 45.8 | 30.6 |

EXAMPLES 5 AND 6

The procedure of Example 1 was repeated except that the strontium nitrate was replaced by barium nitrate. A cylindrical candle of 1-inch diameter and 2.3 inches length was cast from the formulations and upon ignition gave the results shown in Table III.

TABLE III

| Example | 5 | 6 |
|---|---|---|
| Polyvinyl chloride, percent | 10 | 10 |
| Plasticizer, percent | 10 | 10 |
| Barium nitrate, percent | 35 | 35 |
| Magnesium, percent | 35 | 25 |
| Ammonium perchlorate, percent | 10 | 20 |
| Intensity (candles) | 9,200 | 12,800 |
| Color value | .375 | .445 |
| Burn time (seconds) | 22.3 | 18.1 |

As will be apparent to persons skilled in the art, various modifications, adaptations and variations of the foregoing specific disclosure can be made without departing from the teachings of the present invention.

I claim:

1. A color flare comprising a pyrotechnic charge consisting essentially of about 30–65% by weight of a color producing alkaline earth metal salt, about 5–35% by weight of a powdered metal fuel, about 10–30% by weight of ammonium perchlorate oxidizer, and about 20–50% by weight of a plasticized vinyl polymer resin having a moderate to high chlorine content, the ratio of color producing salt to fuel being at least 1:1.

2. The color flare of claim 1 wherein the plasticized resin is free of volatile components, the plasticizer and resin being present in substantially equal proportions.

3. The color flare of claim 1 wherein the resin is polyvinyl chloride.

4. The color flare of claim 1 wherein the charge comprises at least 10 percent by weight of polyvinyl chloride resin and at least 10 percent by weight of a dibasic acid ester plasticizer of low volatility.

5. The color flare of claim 1 wherein the fuel includes powdered magnesium.

6. The color flare of claim 1 wherein the color producing salt is selected from the group consisting of barium and strontium salts.

7. The color flare of claim 1 wherein the color producing salt is strontium nitrate.

References Cited

UNITED STATES PATENTS

| 3,152,935 | 10/1964 | Cadwallader | 149—19 |
| 3,107,186 | 10/1963 | Scurlock et al. | 149—19 |
| 2,939,780 | 6/1960 | Brock | 149—19 X |
| 2,968,542 | 1/1961 | Brock | 149—42 X |
| 3,017,300 | 1/1962 | Herring | 149—41 |
| 3,589,954 | 6/1971 | Filter et al. | 149—84 X |

FOREIGN PATENTS

| 130,801 | 7/1958 | Sweden. |

OTHER REFERENCES

Picatiny Arsenal Technical Report No. 1545, "Use of Polyvinyl Chloride in Compositions for Flares" (1957).

Picatiny Arsenal Technical Report No. 2318, "Burning Characteristics of Improved Green Pyrotechnic Compositions" (1956).

CARL L. QUARFORTH, Primary Examiner

E. A. MILLER, Assistant Examiner

U.S. Cl. X.R.

149—41, 44, 61, 76, 116